(12) United States Patent
Govindarajulu

(10) Patent No.: US 12,107,501 B2
(45) Date of Patent: Oct. 1, 2024

(54) METHOD AND APPARATUS FOR CONFIGURING A SWITCHED-MODE POWER CONVERTER

(71) Applicant: Silicon Laboratories Inc., Austin, TX (US)

(72) Inventor: Srikanth Govindarajulu, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 147 days.

(21) Appl. No.: 17/877,721

(22) Filed: Jul. 29, 2022

(65) Prior Publication Data

US 2023/0396165 A1 Dec. 7, 2023

Related U.S. Application Data

(60) Provisional application No. 63/347,625, filed on Jun. 1, 2022.

(51) Int. Cl.
| | |
|---|---|
| *H02M 3/157* | (2006.01) |
| *H02M 1/08* | (2006.01) |
| *H02M 1/36* | (2007.01) |
| *H02M 3/158* | (2006.01) |

(52) U.S. Cl.
CPC ............ *H02M 3/158* (2013.01); *H02M 1/08* (2013.01); *H02M 1/36* (2013.01); *H02M 3/157* (2013.01)

(58) Field of Classification Search
CPC ........ H02M 1/36; H02M 3/156; H02M 3/157; H02M 3/158
See application file for complete search history.

(56) References Cited

U.S. PATENT DOCUMENTS

| | | | |
|---|---|---|---|
| 9,531,253 B2 | 12/2016 | Wahby et al. | |
| 10,348,283 B1 | 7/2019 | Sonntag et al. | |
| 10,423,174 B1 | 9/2019 | Sonntag et al. | |
| 10,778,099 B1 * | 9/2020 | Womac | ............... H02M 1/32 |
| 2023/0059128 A1 * | 2/2023 | Büthker | ............... H02J 7/0063 |
| 2023/0120432 A1 * | 4/2023 | Womac | ............... H02M 3/1588 |
| | | | 323/282 |

OTHER PUBLICATIONS

Analog Devices, "MAX17220-MAX17225 400mV to 5.5V Input, nanoPower Synchronous Boost Converters with True Shutdown," Rev. 8, Oct. 2021, 22 pages.
Maxim Integrated, "True-Shutdown Circuit," Application Note 4835, Feb. 7, 2011, 2 pages.

* cited by examiner

*Primary Examiner* — Gary L Laxton
(74) *Attorney, Agent, or Firm* — Zagorin Cave LLP

(57) ABSTRACT

A method for operating a switched-mode power converter includes providing to a maximum voltage node as a maximum voltage, a version of the higher of a first voltage on a first node and a second voltage on a second node. The method includes generating a first signal indicating whether to operate the switched-mode power converter in a buck mode of operation or a boost mode of operation based on the first voltage and a first voltage domain based on the maximum voltage. The method includes generating a second signal indicating whether to operate the switched-mode power converter in a buck mode of operation or a boost mode of operation based on the first voltage and a second voltage domain of the first voltage. The method includes combining the first signal and the second signal to generate a digital configuration indicator signal.

20 Claims, 8 Drawing Sheets

METHOD AND APPARATUS FOR CONFIGURING A SWITCHED-MODE POWER CONVERTER

CROSS-REFERENCE TO RELATED APPLICATION(S)

This application claims benefit of Provisional Application No. 63/347,625, entitled "METHOD AND APPARATUS TO CONFIGURE A DC-DC CONVERTER IN EITHER BUCK MODE OR BOOST MODE OF OPERATION," naming Srikanth Govindarajulu as inventor, filed on Jun. 1, 2022, which application is hereby incorporated by reference.

This application is related to U.S. patent application Ser. No. 17/828,993, entitled "LOW POWER BOOST CONVERTER STARTUP WITH SOFT START AND OUTPUT VOLTAGE OVERSHOOT LIMITING," naming Srikanth Govindarajulu et al. as inventors, filed on May 31, 2022, which application is hereby incorporated by reference.

This application is related to U.S. patent application Ser. No. 17/828,994, entitled "DYNAMICALLY BIASING A BULK NODE AND A GATE NODE OF A TRANSISTOR IN A DC-DC VOLTAGE CONVERTER," naming Srikanth Govindarajulu et al. as inventors, filed on May 31, 2022, which application is hereby incorporated by reference.

BACKGROUND

Field of the Invention

The present invention is related to power converters and more particularly to switched-mode power converters.

Description of the Related Art

In general, battery-powered applications or other fixed power supply applications use switched-mode power converter to generate a usable voltage level that differs from a voltage level provided by a fixed power supply. An exemplary switched-mode power converter continuously switches between a full-on state and a full-off state and regulates the output voltage by varying the ratio of on-time to off-time (i.e., the duty cycle) of a pass transistor. A conventional boost converter is a switched-mode power converter that generates an output voltage that is greater than the input voltage (i.e., steps up the input voltage to a higher voltage level) by storing energy in an inductor and releasing the stored energy to a load at a higher voltage. A conventional buck converter is a switched-mode power converter that generates an output voltage that is less than the input voltage (i.e., steps down the input voltage to a lower voltage level) by counteracting the input voltage with a voltage drop across an inductor generated in response to changing inductor current.

An integrated circuit may be used in various types of battery-powered applications. Each of those battery-powered applications may have a different input voltage level. A conventional integrated circuit design includes a buck converter and a boost converter capable of providing those different input voltage levels of the different target applications based on an input voltage. However, only one of those switched-mode power converters is configured for operation of a particular integrated circuit in its target application. Accordingly, improved techniques for providing a fixed voltage are desired.

SUMMARY OF EMBODIMENTS OF THE INVENTION

In at least one embodiment, a method for configuring a switched-mode power converter for operation includes providing to a maximum voltage node as a maximum voltage, a version of the higher of a first voltage on a first node and a second voltage on a second node. The method includes generating a first signal indicating whether to operate the switched-mode power converter in a buck mode of operation or a boost mode of operation based on the first voltage and a first voltage domain defined by the maximum voltage. The method includes generating a second signal indicating whether to operate the switched-mode power converter in a buck mode of operation or a boost mode of operation based on the first voltage and a second voltage domain defined by the first voltage. The method includes combining the first signal and the second signal to generate a digital configuration indicator signal.

In at least one embodiment, an integrated circuit product including a switched-mode power converter includes a first node configured as an input node in a boost mode of operation of the switched-mode power converter and a second node configured as the input node in a buck mode of operation of the switched-mode power converter. The integrated circuit product includes a maximum voltage node and a maximum voltage selection circuit configured to provide to the maximum voltage node as a maximum voltage, a version of the higher of a first voltage on the first node and a second voltage on the second node. The integrated circuit product includes a first circuit configured to provide a first signal indicating whether to operate the switched-mode power converter in the buck mode of operation or the boost mode of operation based on the first voltage and a first voltage domain defined by the maximum voltage. The integrated circuit product includes a second circuit configured to provide a second signal indicating whether to operate the switched-mode power converter in the buck mode of operation or the boost mode of operation based on the first voltage and a second voltage domain defined by the first voltage. The integrated circuit product includes a third circuit configured to combine the first signal and the second signal to generate a digital configuration indicator signal in the first voltage domain.

An integrated circuit product including a switched-mode power converter includes a first circuit configured to provide a first digital configuration signal indicating whether to operate the switched-mode power converter in a buck mode of operation or a boost mode of operation. The integrated circuit product includes a second circuit configured to provide a second digital configuration signal indicating whether to operate the switched-mode power converter in the buck mode of operation or the boost mode of operation. In response to the switched-mode power converter being configured in the boost mode of operation and the switched-mode power converter being disabled, the first digital configuration signal is active and the second digital configuration signal is inactive. In response to the switched-mode power converter being configured in the boost mode of operation, the first digital configuration signal indicates the switched-mode power converter is configured in the boost mode of operation prior to the second digital configuration signal indicating the switched-mode power converter is configured in the boost mode of operation.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

A conventional integrated circuit product includes a buck converter and a boost converter but is configured to use only one of those switched-mode power converters in a target application. For example, a battery is coupled to package terminals for only one of those switched-mode power converters. In another example, only integrated circuit output pads for the buck converter or only integrated circuit output pads for the boost converter are coupled to package terminals according to the target application. Rather than include two separate switched-mode power converters, a switched-mode power converter that can operate in either a buck mode or a boost mode reduces circuitry and may reduce terminal requirements in some embodiments of an integrated circuit product, which can reduce cost of the integrated circuit product configured for a target application. However, the switched-mode power converter, which provides a constant output voltage to power other portions of the integrated circuit product, needs to be one of the first circuits to be configured for operation in response to the product receiving power or in response to a power-on-reset event. A technique for configuring the switched-mode power converter in a buck mode of operation or a boost mode of operation configures the switched-mode power converter for operation before an input voltage stabilizes. In some embodiments, the configuration technique provides an indication of the configuration while the switched-mode power converter is disabled (e.g., to facilitate a fast startup).

Figure 1:
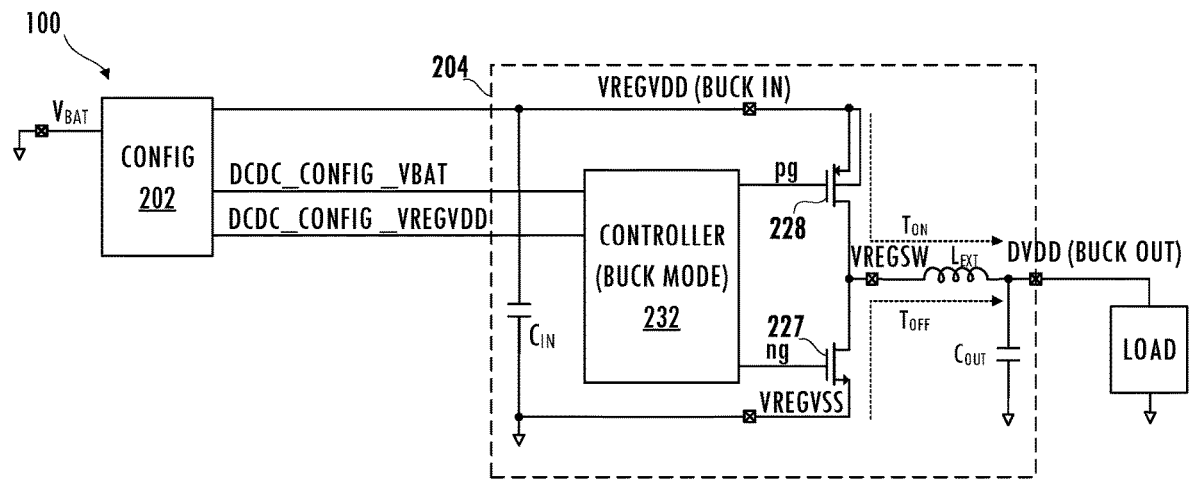
FIG. 1 illustrates a functional block diagram of a DC-DC voltage converter configured in a buck mode of operation.
Figure 2:
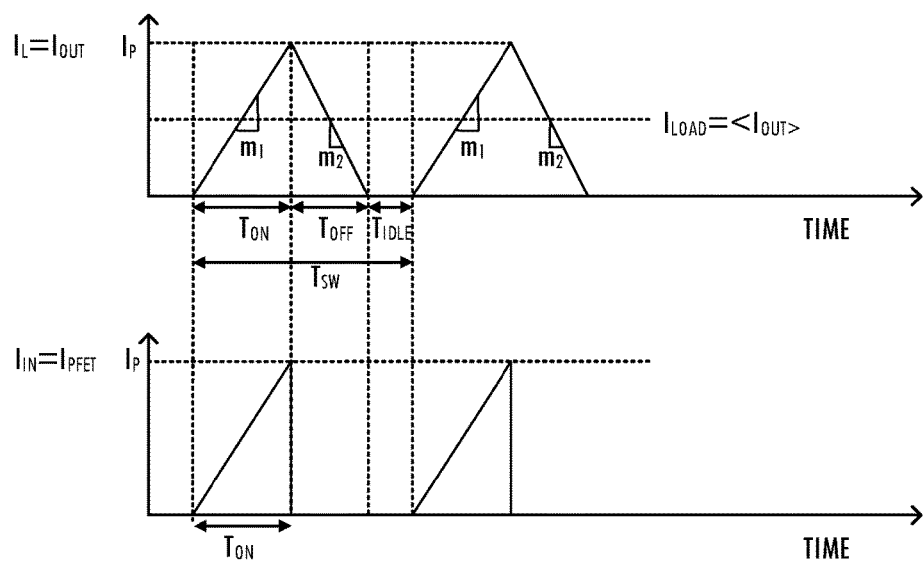
FIG. 2 illustrates exemplary waveforms for currents as a function of time for the DC-DC voltage converter configured for buck mode of operation of FIG. 1.

Referring to FIGS. 1 and 2, instead of including two separate switched-mode power converters, as described above, integrated circuit product 100 includes switched-mode power converter 204 that is capable of operating either in a buck mode or in a boost mode. The integrated circuit product uses the constant output voltage provided by the switched-mode power converter to enable other circuitry, e.g., a system controller and associated memory. Since the system controller is not enabled during a power-up event or a power-on-reset event, switched-mode power converter 204 cannot readily access the configuration information from non-volatile memory. Accordingly, integrated circuit product 100 includes configuration circuit 202, which implements a robust technique for determining the configuration of switched-mode power converter 204 in integrated circuit product 100. In at least one embodiment, configuration circuit 202 provides configuration indicator signals DCDC_CONFIG_VBAT and DCDC_CONFIG_VREGVDD to controller 232, which operates switched-mode power converter 204 (e.g., by controlling the on-time and off-time of n-type transistor 227 and p-type transistor 228) according to those indicator signals.

In an exemplary embodiment, when configuration indicator signals DCDC_CONFIG_VBAT and DCDC_CONFIG_VREGVDD have values (e.g., '1') that indicate the boost mode of operation, switched-mode power converter 204 first turns on n-type transistor 227 and energizes the inductor during time $T_{ON}$. In response reaching the inductor peak current or maximum setting for time $T_{ON}$, controller 232 turns off n-type transistor 227 and turns on p-type transistor 228 and de-energizes the inductor while charging output capacitor $C_{OUT}$ during time $T_{OFF}$. When configuration indicator signals DCDC_CONFIG_VBAT and DCDC_CONFIG_VREGVDD have values (e.g., '0') that indicate the buck mode of operation, switched-mode power converter 204 first turns on p-type transistor 228 and energizes the inductor during time $T_{ON}$. In response reaching the inductor peak current or maximum setting for time $T_{ON}$, controller 232 turns off p-type transistor 228 and turns on n-type transistor 227 and de-energizes the inductor during time $T_{OFF}$. In the buck mode of operation, switched-mode power converter 204 charges output capacitor $C_{OUT}$ during time $T_{ON}$ and during time $T_{OFF}$.

In an embodiment, a control circuit (e.g., an external management unit or DC-DC digital interface state machine and logic circuit) also uses configuration indicator signals DCDC_CONFIG_VBAT and DCDC_CONFIG_VREGVDD to determine a power-up sequence for other circuitry. For example, when configuration indicator signals DCDC_CONFIG_VBAT and DCDC_CONFIG_VREGVDD have values (e.g., '1') that indicate the boost mode of operation, the control circuit waits for switched-mode power converter 204 to start up using boost startup circuitry to power up terminal DVDD close to a nominal voltage (e.g., 1.8 V). After charging the output node to a target voltage level, the control circuit boots up and loads calibration or trim values to registers from memory before causing switched-mode power converter 204 to enter a normal boost mode of operation. In addition, the control circuit shuts down other portions of an integrated circuit in response to switched-mode power converter 204 being disabled using an external terminal or a register write command.

When configuration indicator signals DCDC_CONFIG_VBAT and DCDC_CONFIG_VREGVDD have values (e.g., '0') that indicate the buck mode of operation, the control circuit powers up switched-mode power converter 204 in a bypass mode where terminal DVDD is powered up to the same voltage level as the buck input voltage level (i.e., voltage on terminal VREGVDD). After powering up in the bypass mode with VREGVDD=DVDD (e.g., 3 V), the control circuit loads calibration or trim values to registers from memory. The control circuit transitions switched-mode power converter 204 from the bypass mode to normal buck mode of operation in response to a register write command (e.g., to a digital interface register). In the buck mode of operation, switched-mode power converter 204 regulates terminal DVDD to provide an output voltage level (e.g., 1.8 V) that is lower than the input voltage level (e.g., 2.2 V-3.8 V). When configuration indicator signals DCDC_CONFIG_VBAT and DCDC_CONFIG_VREGVDD have values (e.g., '0') that indicate the buck mode of operation, the control circuit causes switched-mode power converter 204 to exit the buck mode of operation and transition to a bypass mode in response to switched-mode power converter 204 being disabled using an external terminal or a register write command.

In the embodiment of switched-mode power converter 204 of FIGS. 1 and 2, during integrated circuit boot-up, configuration circuit 202 determines that the switched-mode power converter is configured for operating in a buck mode and generates configuration indicator signals DCDC_CONFIG_VBAT and DCDC_CONFIG_VREGVDD to have digital values (e.g., '0') that indicate the buck mode of operation. Controller 232 operates the switched-mode power converter in buck mode based on those configuration indicator signals. The switched-mode power converter receives an input voltage of approximately 2.2 V to 3.8 V on terminal VREGVDD and generates an output voltage of approximately 1.8 V on terminal DVDD. In at least one embodiment of integrated circuit product 100, terminals VREGVDD, DVDD, VREGVSS, and VREGSW are bonded to separate pins and terminal VBAT is bonded to a paddle (e.g., 0 V) in a quad-flat no-leads package or is connected externally to 0 V in a chip-scale package. During time $T_{ON}$ of buck operation, current flows from terminal VREGVDD through a p-type transistor to inductor $L_{EXT}$ and to a load via terminal DVDD at a rate of m1=(VREGVDD−DVDD)/$L_{EXT}$. During time $T_{OFF}$ of buck operation, current flows from VREGVSS through an n-type transistor through inductor $L_{EXT}$ and to the load via terminal DVDD at a rate of m2=— DVDD/$L_{EXT}$. The load current is approximately equal to (0.5×IPEAK×($T_{ON}$+$T_{OFF}$))/$T_{SW}$. In at least one embodiment, switched-mode power converter 204 operates in the buck mode in discontinuous conduction mode (i.e., idle time $T_{IDLE}$ is greater than zero). In other embodiments, switched-mode power converter 204 operates in the buck mode in continuous conduction mode (i.e., where the inductor current is non-zero from one cycle to the next) and idle time $T_{IDLE}$ equals zero.

Figure 3:
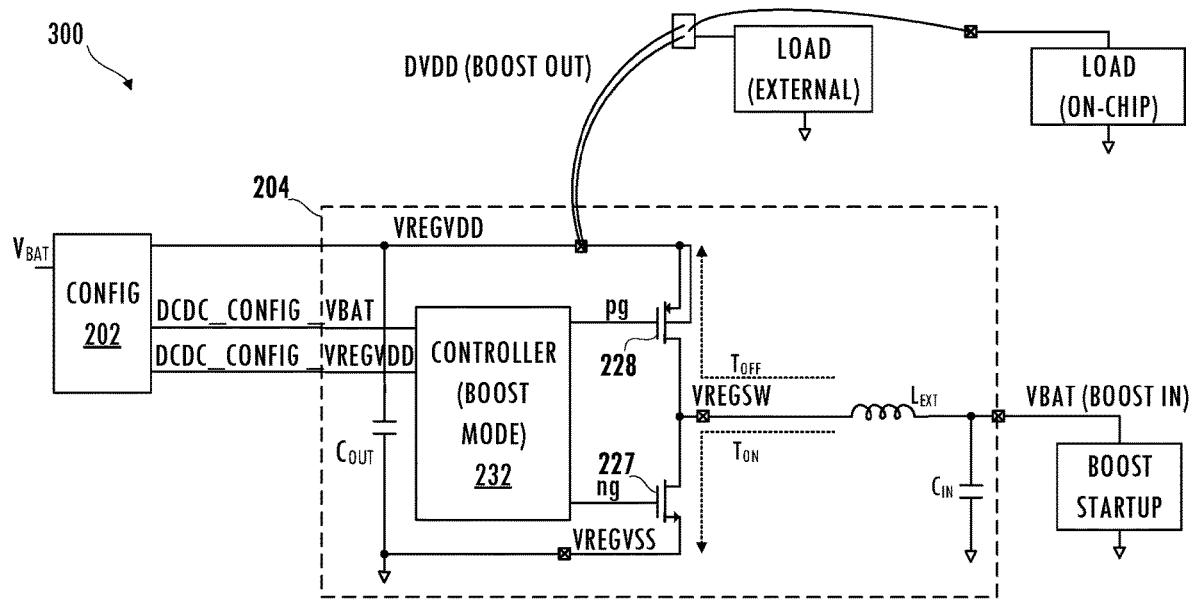
FIG. 3 illustrates a functional block diagram of a switched-mode power converter configured in a boost mode of operation.
Figure 4:
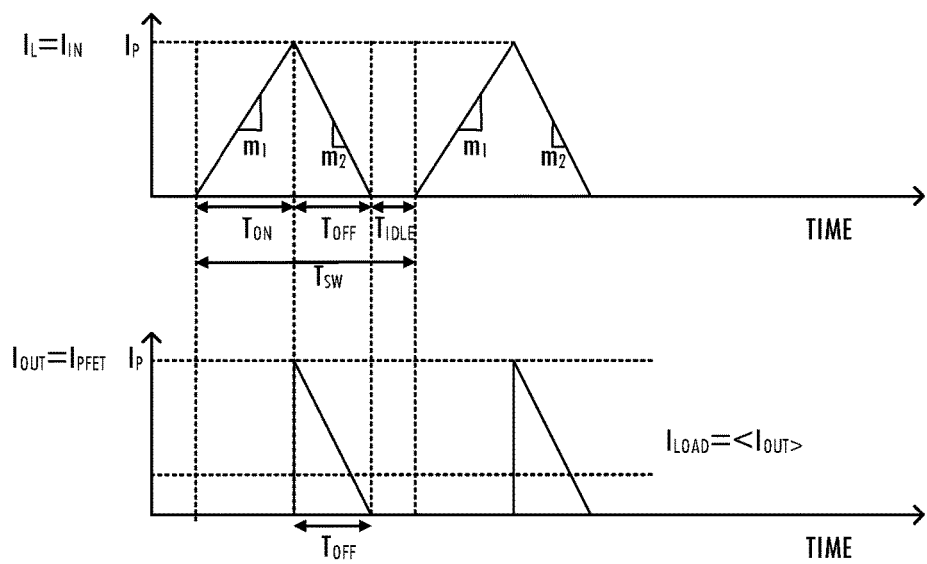
FIG. 4 illustrates exemplary waveforms for currents as a function of time for the switched-mode power converter configured for buck mode of operation of FIG. 3.

Referring to FIGS. 3 and 4, integrated circuit product 300 includes a switched-mode power converter that is capable of operating either in buck mode or in boost mode and includes configuration circuit 202, which determines the configuration of the switched-mode power converter in integrated circuit product 300. In an exemplary embodiment of integrated circuit product 300, switched-mode power converter 204 is configured to operate in boost mode and receives an input voltage of approximately 0.8 V to 1.7 V on terminal VBAT and generates an output voltage of approximately 1.8 V on terminal VREGVDD. Configuration circuit 202 generates configuration indicator signals DCDC_CONFIG_VBAT and DCDC_CONFIG_VREGVDD to have digital values (e.g., '1') that indicate the boost mode of operation to controller 232. In at least one embodiment of integrated circuit product 300, terminals VREGVDD and DVDD are bonded together to the same pin, or are coupled together externally, and terminals VBAT, VREGVSS, and VREGSW are bonded out to separate pins. During time $T_{ON}$ of boost operation, current flows from terminal VBAT through inductor $L_{EXT}$ through an n-type transistor and to terminal VREGVSS at a rate of m2=VBAT/$L_{EXT}$. During time $T_{OFF}$ of boost operation, current flows to terminal VREGVDD through a p-type transistor via inductor $L_{EXT}$ at a rate of m1=(VBAT−VREGVDD)/$L_{EXT}$. The load current is (0.5× $I_{PEAK}$×$T_{OFF}$)/$T_{SW}$. In at least one embodiment, switched-mode power converter 204 operates in the boost mode in discontinuous conduction mode (i.e., idle time $T_{IDLE}$ is greater than zero). In other embodiments, switched-mode power converter 204 operates in the boost mode in continuous conduction mode (i.e., the inductor current is non-zero from one cycle to the next) and idle time $T_{IDLE}$ equals zero.

In at least one embodiment of configuration circuit 202, the transistors are high voltage (i.e., thick oxide) transistors. In at least one embodiment, configuration circuit 202 detects the voltage level on terminal VBAT, which is the input voltage of switched-mode power converter 204 configured in the boost mode of operation. When configuration circuit 202 detects the voltage level on terminal VBAT at a level higher than a predetermined threshold (e.g., the threshold of a high voltage (i.e., thick oxide) n-type transistor (i.e., at logic '1')), then configuration circuit 202 sets configuration indicator signals DCDC_CONFIG_VBAT and DCDC_CONFIG_VREGVDD (e.g., to logic '1'), thereby configuring controller 232 to operate switched-mode power converter 204 in the boost mode of operation. When configuration circuit 202 detects the voltage level on terminal VBAT at a level lower than the predetermined threshold (e.g., the threshold of high voltage (i.e., thick oxide) n-type transistor (i.e., at logic '0')), then configuration circuit 202 resets configuration indicator signals DCDC_CONFIG_VBAT and DCDC_CONFIG_VREGVDD (e.g., to logic '0'), thereby configuring controller 232 to operate switched-mode power converter 204 in the buck mode of operation.

When configured in the boost mode of operation, terminal VBAT is the input terminal of switched-mode power converter 204 and terminal VREGVDD is the output terminal of switched-mode power converter 204. In an embodiment, node DVDD, which powers up the rest of the system-on-a-chip, is either co-bonded to the same pin as the terminal VREGVDD or shorted together externally on a printed circuit board. When configured in the buck mode of operation, terminal VBAT is grounded to 0 V (e.g., by downbond) in a quad flat no-lead package or is grounded externally to 0 V in chip-scale package. When configured in the buck mode of operation, the input voltage is applied at terminal VREGVDD of switched-mode power converter 204 and the output voltage is provided by node DVDD of switched-mode power converter 204.

Figure 5:
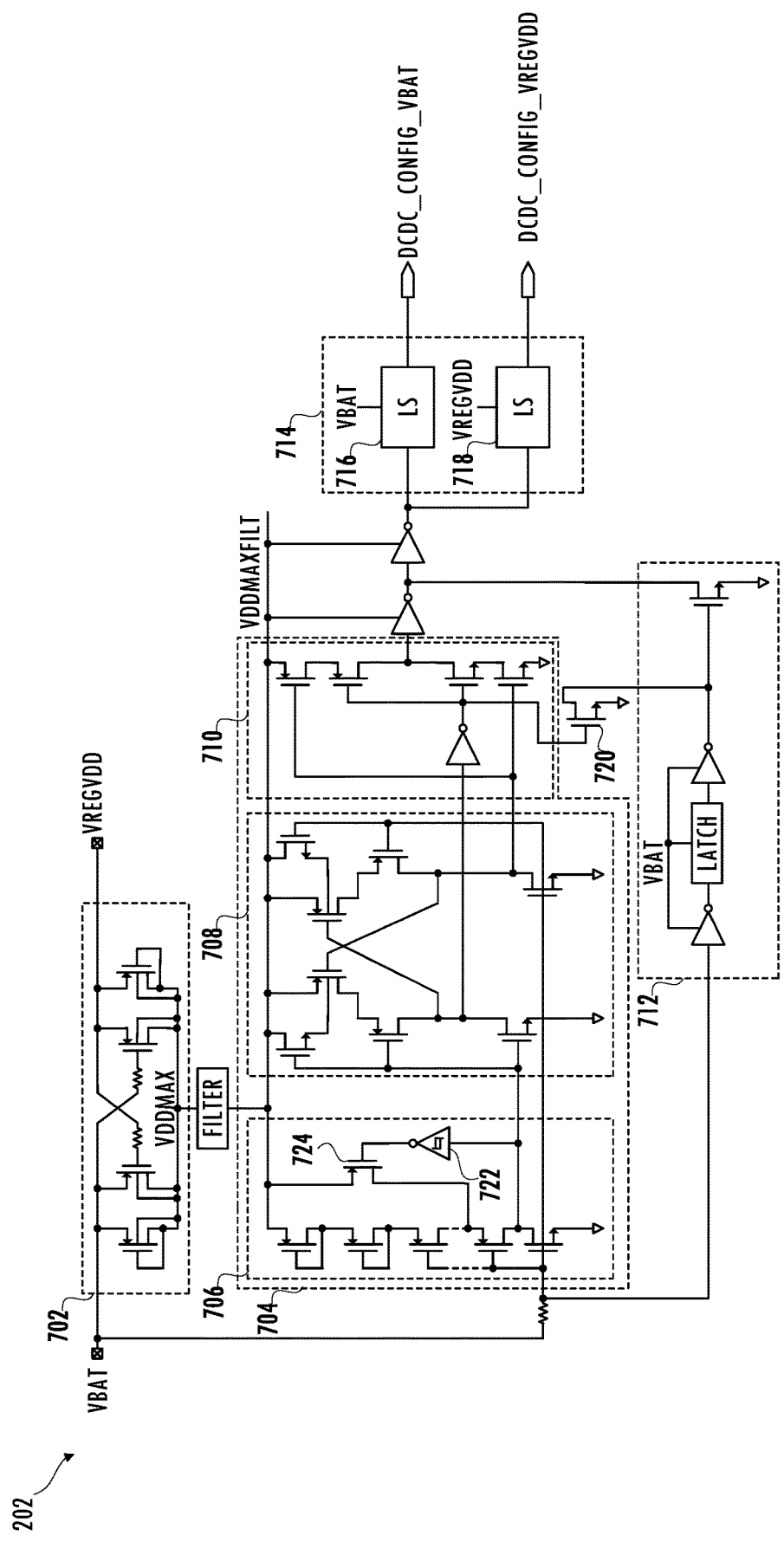
FIG. 5 illustrates a circuit diagram of configuration detection circuitry for a switched-mode power converter consistent with at least one embodiment of the invention.

Referring to FIG. 5, in at least one embodiment, configuration circuit 202 is coupled to terminal VBAT and terminal VREGVDD and generates configuration indicator signals DCDC_CONFIG_VBAT and DCDC_CONFIG_VREGVDD based on the voltage levels on terminal VBAT. In an embodiment, a voltage level in the range of 0.8 V to 1.7 V on terminal VBAT (e.g., a voltage level greater than the threshold voltage of a high voltage (i.e., thick oxide n-type transistor) indicates a boost mode configuration and a voltage level of 0 V on terminal VBAT indicates buck mode. Maximum voltage selector 702 selects the higher voltage of the voltage on terminal VBAT and the voltage on terminal VREGVDD and provides that higher voltage to node VDDMAX using an enabled transistor of a cross-coupled pair of p-type transistors. When the voltage level on terminal VBAT equals the voltage level on terminal VREGVDD, maximum voltage selector 702 provides the higher voltage less one diode drop to node VDDMAX. In at least one embodiment, an RC filter attenuates noise on node VDDMAX and provides VDDMAX_FILT as the power supply voltage for path 704. Path 704, which generates the indicator when in buck mode and the voltage on terminal VBAT equals zero, is coupled in parallel with path 712. Path 712 is powered by the input voltage on terminal VBAT and facilitates generating the indicators when in boost mode. Those parallel paths use different voltage domains to detect whether the voltage on terminal VBAT has a voltage level corresponding to logic '1' or logic '0.'

In at least one embodiment, path 704, which is powered by the output of maximum voltage selector 702, includes skewed inverter 706 having strong n-type transistors and weak (e.g., narrow width, long channel transistors) p-type transistors. As referred to herein, a strong n-type transistor has a size (i.e., W/L) that is much larger than the size of an n-type transistor in a typical digital inverter circuit. The wider width increases reliability of detecting a logic '1' on terminal VBAT. Skewed inverter 706 is configured to detect whether the voltage on terminal VBAT is close to the threshold voltage of an n-type transistor. In an embodiment, skewed inverter 706 is skewed to weaken the p-type transistor so that there is no substantial leakage through the inverter stage during all combinations of the voltage on terminal VBAT and the voltage on terminal VREGVDD in the maximum voltage selector. For example, in an exemplary boost converter, before power-up, the voltage on terminal VBAT is 0.8 V and the voltage on terminal VREGVDD is 0 V. However, after power-up, the voltage on terminal VREGVDD (a.k.a., node DVDD in boost converter) is at 1.8V. Therefore, the output of maximum voltage selector is 0.8 V before power-up and 1.8 V after power-up, while the voltage on terminal VBAT is at V. Accordingly, skewed inverter 706 is skewed such that its output is logic '1' whenever the voltage on terminal VBAT is higher than the n-type transistor threshold for both outputs of the maximum voltage selector. In an embodiment of configuration circuit 202, the output of skewed inverter 706 is stored in latch 708, e.g., a p-type transistor cross-coupled latch, and the stored value is inverted by inverter 710. In at least one embodiment, skewed inverter 706 includes hysteretic inverter 722, which controls p-type transistor 724 using a feedback signal to speed up skewed inverter 706.

In at least one embodiment of configuration circuit 202, path 712 is a second parallel path that enables detection of the boost mode faster and earlier than path 704 during ramp-up of the voltage on terminal VBAT. Path 712 is powered by the voltage on terminal VBAT. Path 712 includes a conventional inverter that compares the voltage on terminal VBAT to the threshold voltages of transistors to produce a logic '1' whenever VBAT is higher than the threshold of a high voltage (i.e., thick oxide) n-type transistor. The output of the regular inverter is latched into another p-type transistor cross-coupled latch also powered by VBAT. The output of this latch is then multiplexed into the main signal path via an n-type transistor. In the buck mode of operation, when the terminal VBAT is grounded, then this n-type transistor is disabled by the logic powered by the maximum voltage selector (e.g., by selectively discharging the gate terminal via transistor 720). In at least one embodiment, n-type transistor 720, which is controlled by path 704 to prevent a high 'Z' state of the digital indicator outputs of configuration circuit 202 in the buck mode configuration. Level shifters 714 adjust the levels of the indicator signal for voltage domains used by controller 232. For example, level shifter 716 generates configuration indicator signal DCDC_CONFIG_VBAT using a voltage domain defined by the voltage level on terminal VBAT and level shifter 718 generates configuration indicator signal DCDC_CONFIG_VREGVDD using a voltage domain defined by the voltage level on terminal VREGVDD. In an embodiment of configuration circuit 202, a logic '1' of an indicator corresponds to the boost configuration and a logic '0' of the indicator corresponds to the buck configuration.

Figure 6:
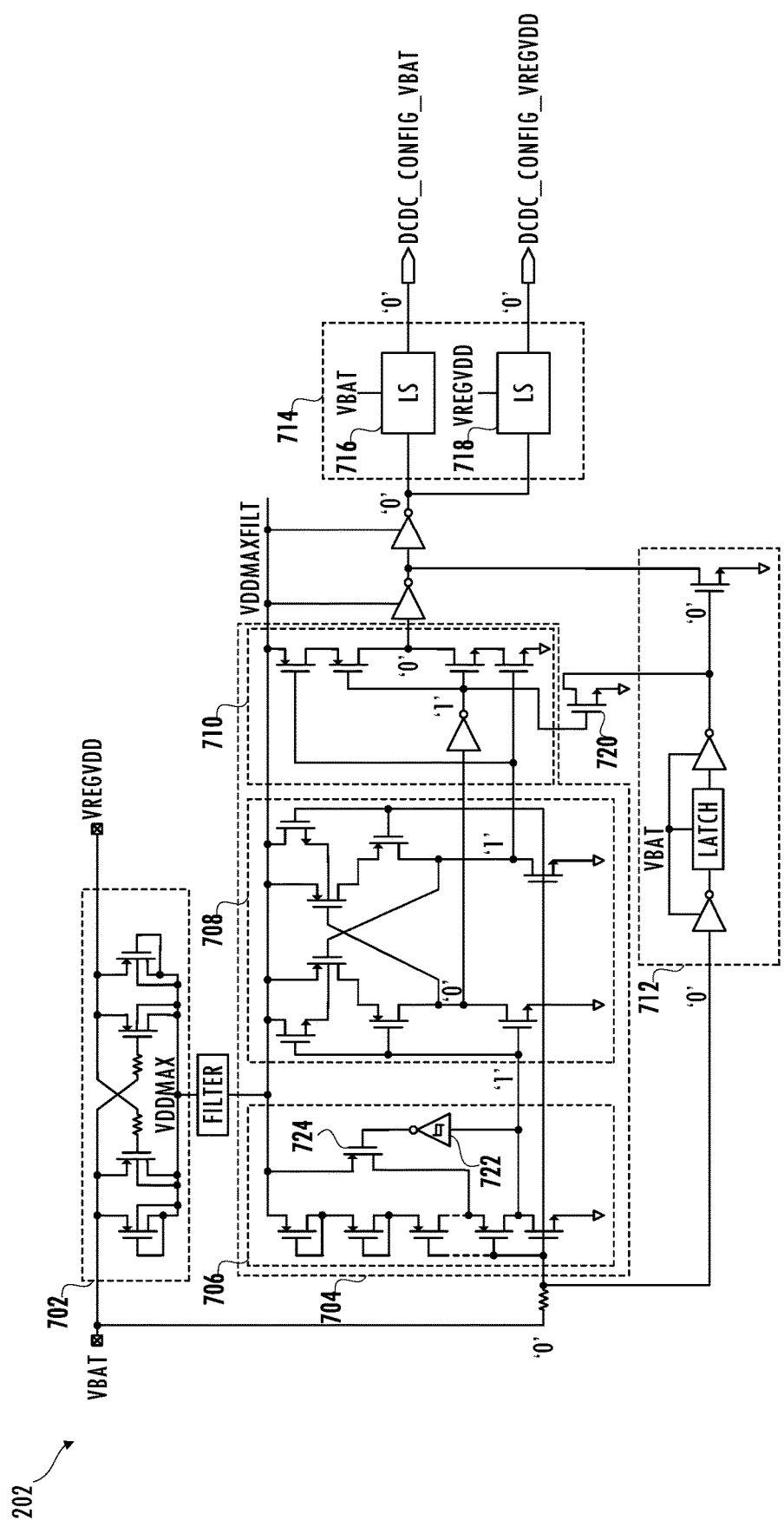
FIG. 6 illustrates the circuit diagram of the configuration detection circuitry of FIG. 5 including logic levels associated with the buck mode of operation consistent with at least one embodiment of the invention.

FIG. 6 illustrates the logic levels at various nodes of configuration circuit 202 in response to terminal VBAT having a voltage that corresponds to a logic '0,' thereby indicating the buck configuration. The output of skewed inverter 706 corresponds to logic '1' and latch 708 provides a corresponding latch output signal (logic '1') and complementary latch output signal (logic '0'). In an embodiment of configuration circuit 202, since configuration indicator signal DCDC_CONFIG_VBAT needs to be immune to noise to maintain the switched-mode power converter configuration in the buck mode even in a noisy environment, in at least one embodiment, inverter 710 has a topology that changes the output state of the output signal to logic '0' only in response to both the latch output signal and the complementary latch output signal having been updated. This topology is more immune to power supply noise than a conventional CMOS inverter and does not change the state of the output signal unless both of those signals change. However, in other embodiments, inverter 710 is a conventional CMOS inverter. The output of inverter 710 is combined with the output of path 712 (e.g., by sinking the inverted output of inverter 710 using an n-type transistor responsive to the output of parallel path 712) and inverted to restore the true logic value (logic '0') before level-shifters 714 generate configuration indicator signals DCDC_CONFIG_VBAT (logic '0') and DCDC_CONFIG_VREGVDD (logic '0') in corresponding voltage domains based on the indicator signal.

Figure 7:
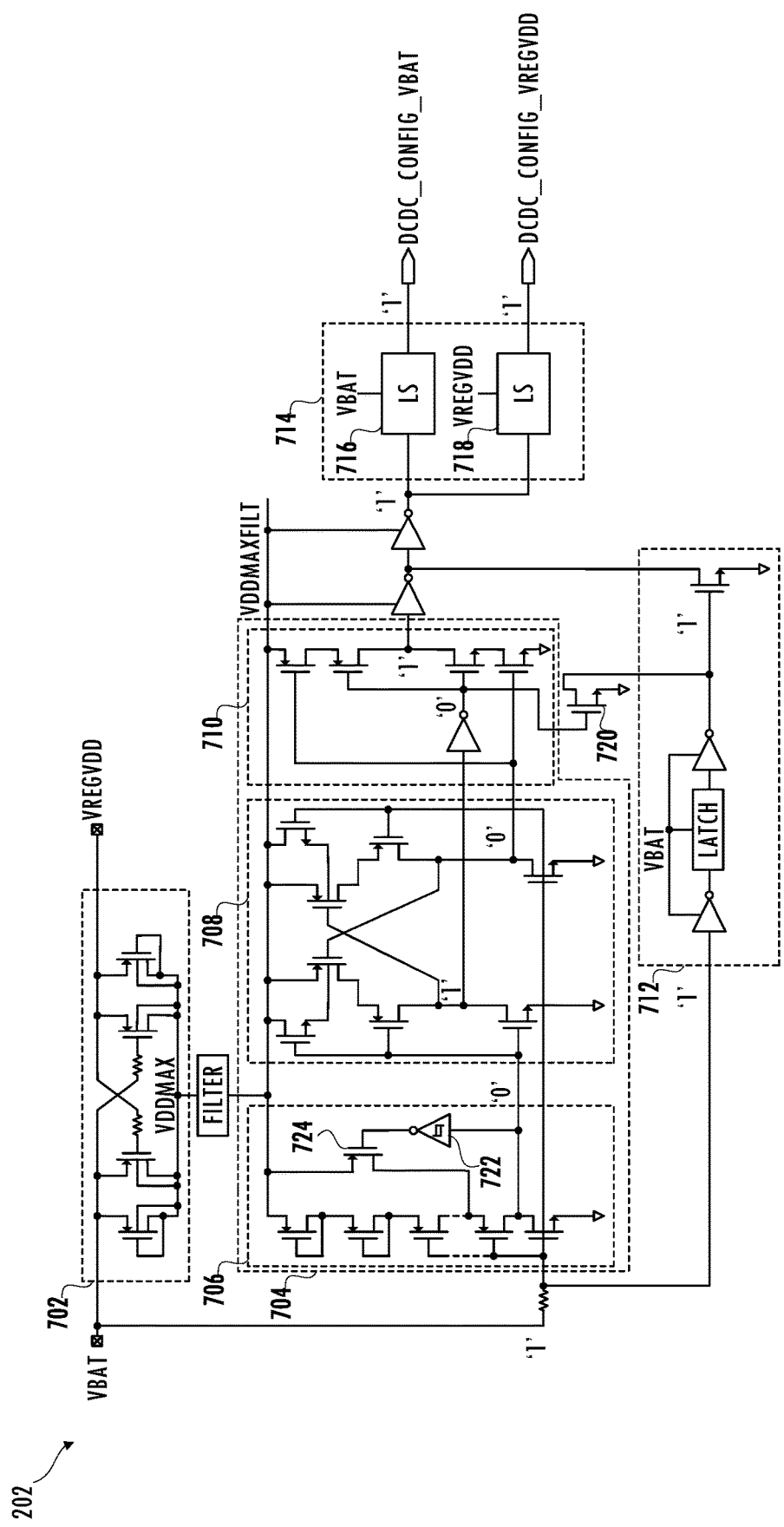
FIG. 7 illustrates the circuit diagram of the configuration detection circuitry of FIG. 5 including logic levels associated with the boost mode of operation consistent with at least one embodiment of the invention.

FIG. 7 illustrates the logic levels at various nodes of configuration circuit 202 in response to terminal VBAT having a voltage level that corresponds to a logic '1,' thereby indicating a boost configuration. The output of skewed inverter 706 is logic '0' and latch 708 provides a corresponding output signal (logic '0') and a complementary latch output signal (logic '1'). The output of inverter 710 is combined with the output of path 712 (e.g., by sinking the inverted output of inverter 710 using an n-type transistor responsive to parallel path 712) and inverted to restore the true logic value (logic '1') before level-shifters 714 generate configuration indicator signals DCDC_CONFIG_VBAT (logic '1') and DCDC_CONFIG_VREGVDD (logic '1') based on the indicator signal.

Figure 8:
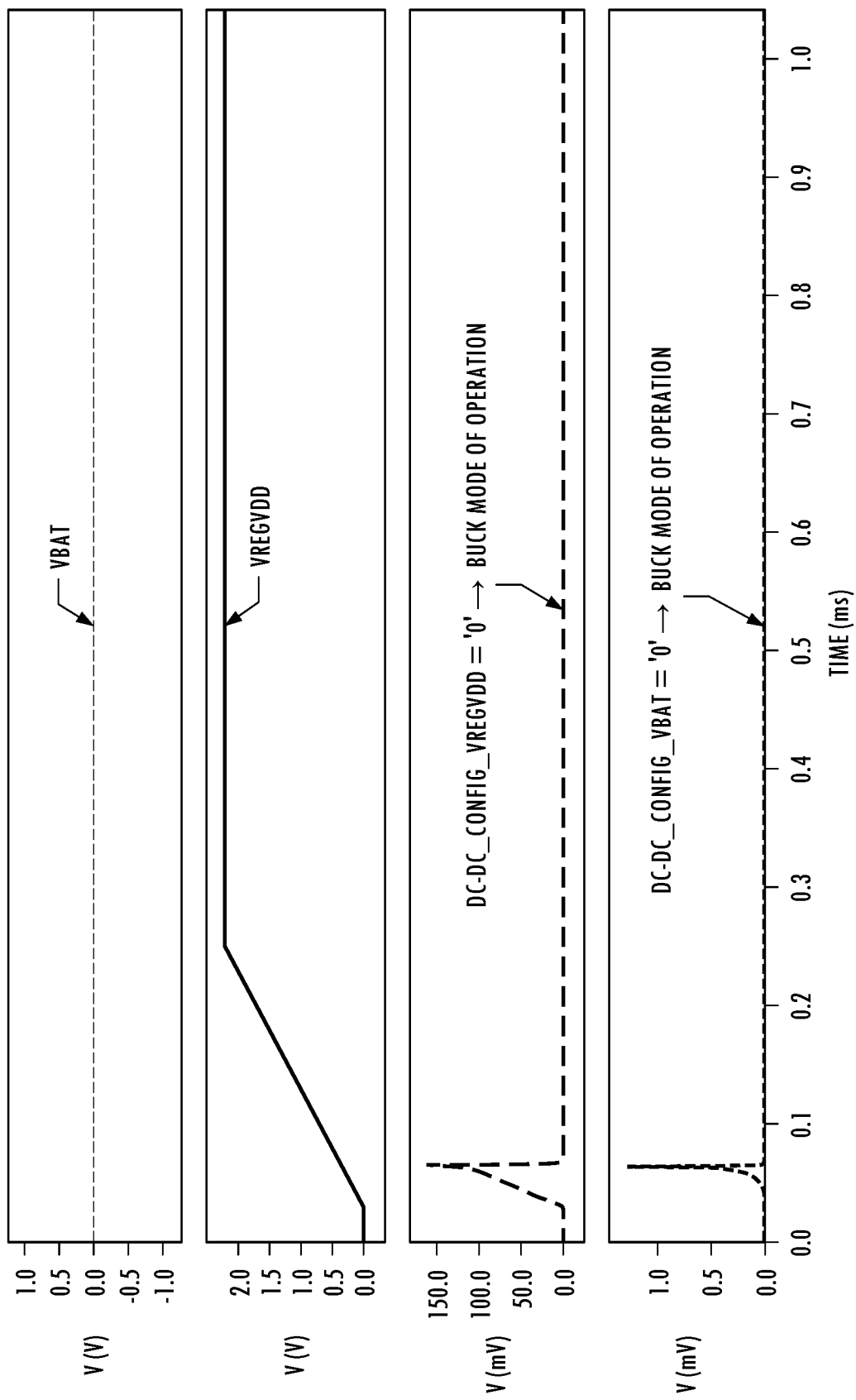
FIG. 8 illustrates exemplary waveforms for various voltages as a function of time for the detection circuitry of FIG. 5 detecting a buck mode of operation consistent with at least one embodiment of the invention.

Referring to FIGS. 5 and 8, waveforms for the transient responses of terminals of an embodiment of configuration circuit 202 when the switched-mode power converter is coupled in a system-on-a-chip as a buck converter. The signal on terminal VBAT has a voltage level detected by the configuration circuit as logic '0.' Prior to a power-on-reset event, terminal VREGVDD is at a ground voltage level and indicator signals DCDC_CONFIG_VBAT and DCDC_CO-NFIG_VREGVDD have voltage levels corresponding to logic '0.' As the switched-mode power converter powers up, configuration circuit 202 generates spurious voltage levels for indicator signals DCDC_CONFIG_VBAT and DCDC_ CONFIG_VREGVDD before resolving to a level corresponding to logic '0' (e.g., at approximately 0.07 ms, and as early as approximately 0.03 ms) for the buck mode of operation. Meanwhile, terminal VREGVDD transitions to the target output voltage of the buck mode of the switched-mode power converter.

Figure 9:
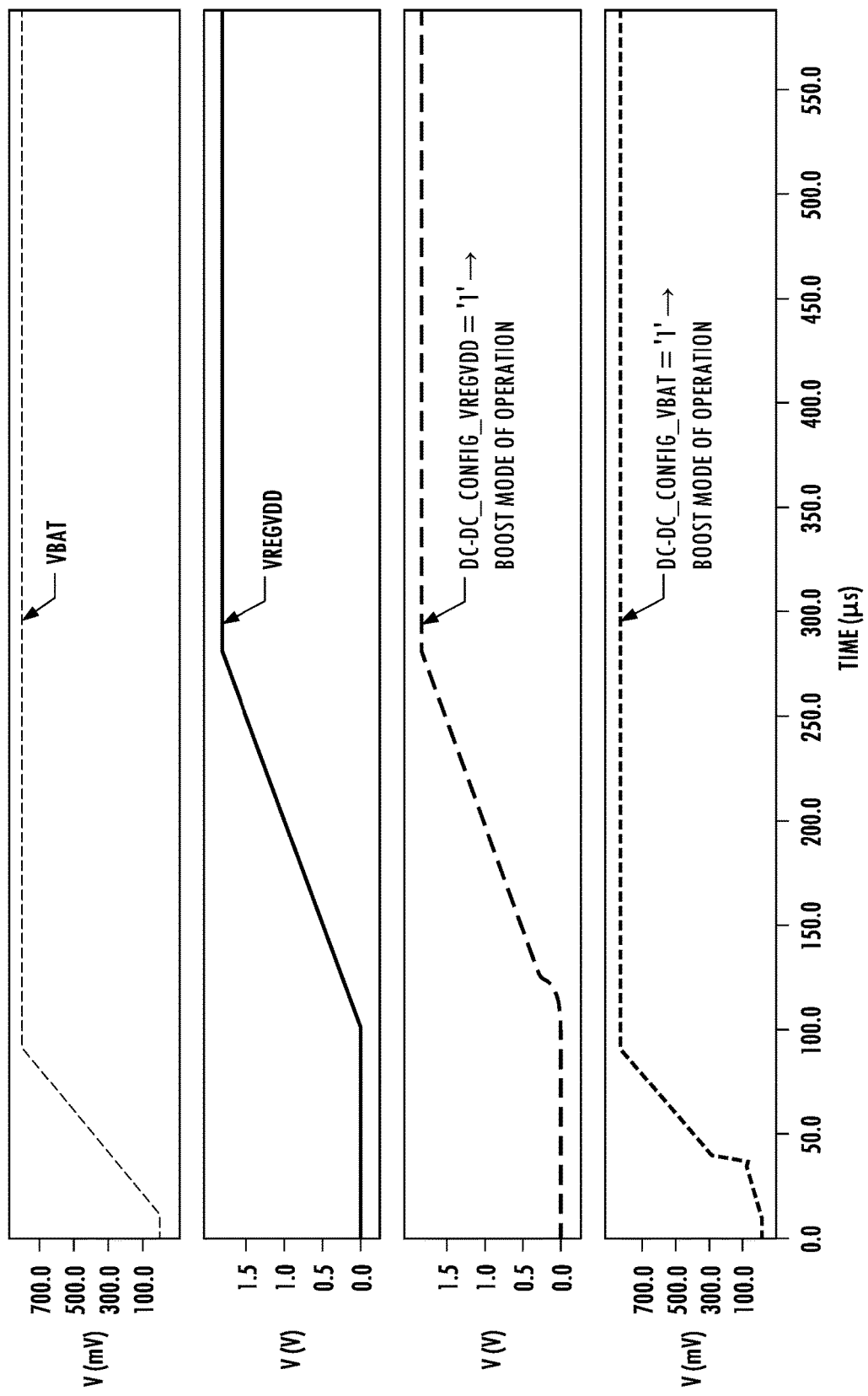
FIG. 9 illustrates exemplary waveforms for various voltages as a function of time for the detection circuitry of FIG. 5 detecting a boost mode of operation consistent with at least one embodiment of the invention.

Referring to FIGS. 5 and 9, waveforms illustrate the transient response of the terminals of configuration circuit 202 when the switched-mode power converter is coupled in a system-on-a-chip as a boost converter. Prior to a power-on-reset event, terminal VBAT and terminal VREGVDD are at a ground voltage level and indicator signals DCDC_CO-NFIG_VBAT and DCDC_CONFIG_VREGVDD have voltage levels corresponding to logic '0.' In response to the input terminal being coupled to an input power supply (e.g., 800 mV battery), the signal on terminal VBAT transitions to a voltage level corresponding to logic '1,' which is detected by configuration circuit 202 as logic '1.' As the voltage on terminal VBAT increases, configuration circuit 202 transitions indicator signals DCDC_CONFIG_VBAT and DCDC_ CONFIG_VREGVDD to levels corresponding to logic '1.' Path 712 and indicator signal DCDC_CONFIG_V-BAT are referenced to the voltage domain defined by the voltage on terminal VBAT and ground. Path 704 and indicator DCDC_ CONFIG_VREGVDD are referenced to the voltage domain defined by the voltage on VDDMAXFILT (which transitions from the voltage on terminal VBAT to the voltage on VREGVDD) and ground. Accordingly, indicator signal DCDC_CONFIG_VBAT detects boost mode faster than (e.g., as early as 30 μs) indicator DCDC_CON-FIG_VREGVDD.

Figure 10:
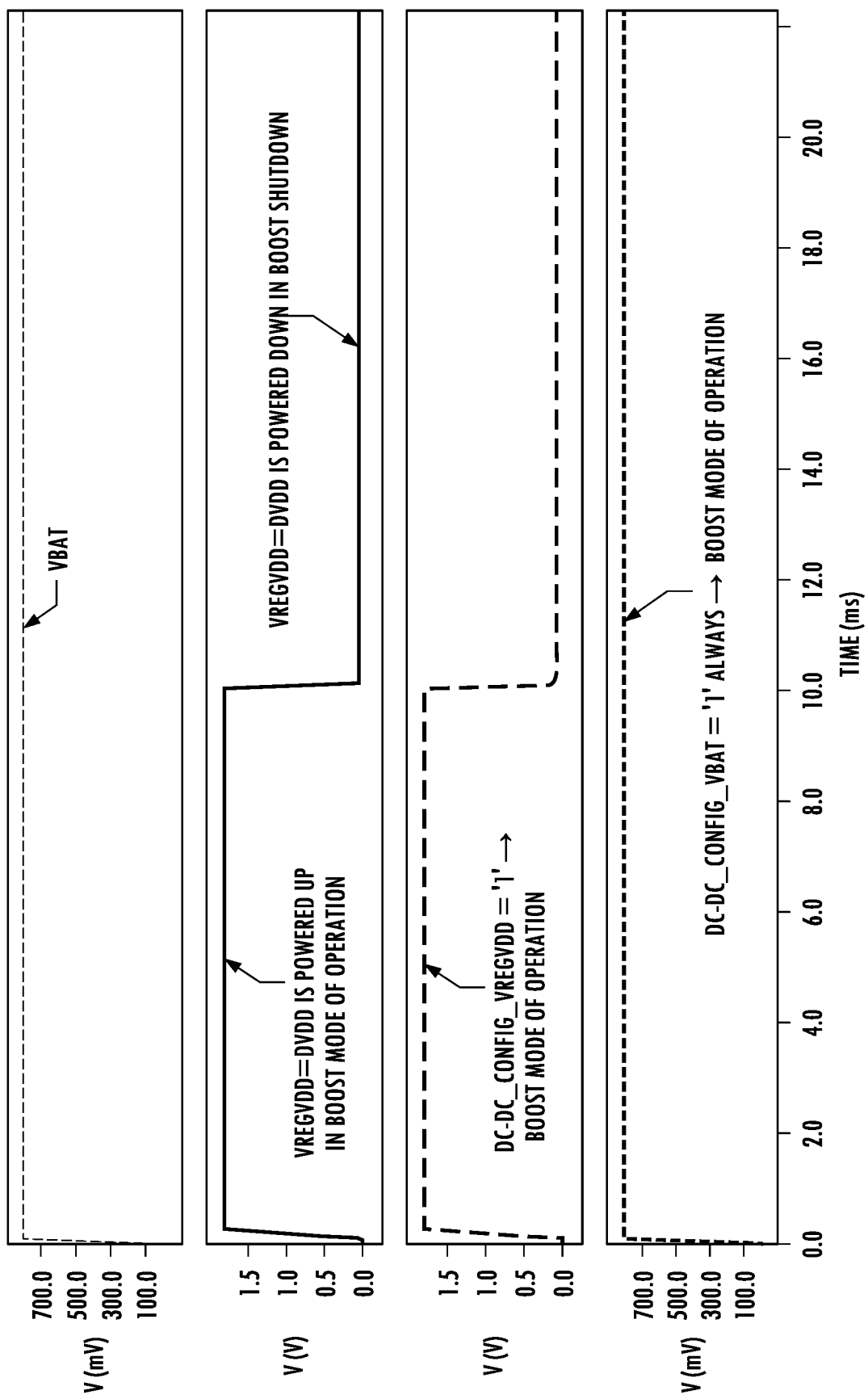
FIG. 10 illustrates exemplary waveforms for various voltages as a function of time for shutdown of a switched-mode power converter configured in a boost mode of operation consistent with at least one embodiment of the invention.

Referring to FIGS. 5 and 10, in an embodiment of the switched-mode power converter coupled in a system-on-a-chip as a boost converter, although the integrated circuit product remains coupled to a power supply via terminal VBAT, the integrated circuit product and thus, the switched-mode power converter itself, may be disabled (i.e., powered down) while configured as a boost converter. In response to the switched-mode power converter being disabled, the signal on terminal VREGVDD=DVDD transitions to ground (i.e., 0 V). Accordingly, configuration circuit 202 transitions indicator signal DCDC_CONFIG_VREGVDD from an active level (e.g., logic '1') to an inactive level (e.g., logic '0'). However, configuration circuit 202 maintains indicator signal DCDC_CONFIG_VBAT at the active level (e.g., logic '1') and maintains an indication of the switched-mode power converter being coupled in a system-on-a-chip as a boost converter even when the controller is disabled, thereby facilitating fast startup of the boost converter.

Thus, techniques for configuring a switched-mode power converter have been described. The terms "first," "second," "third," and so forth, as used in the claims, unless otherwise clear by context, is to distinguish between different items in the claims and does not otherwise indicate or imply any order in time, location or quality. For example, "a first received signal," "a second received signal," does not indicate or imply that the first received signal occurs in time before the second received signal. Variations and modifications of the embodiments disclosed herein may be made based on the description set forth herein, without departing from the scope of the invention as set forth in the following claims.

What is claimed is:

1. A method for configuring a switched-mode power converter for operation, the method comprising:
   providing to a maximum voltage node as a maximum voltage, a version of the higher of a first voltage on a first node and a second voltage on a second node;
   generating a first signal indicating whether to operate the switched-mode power converter in a buck mode of operation or a boost mode of operation based on the first voltage and a first voltage domain defined by the maximum voltage;
   generating a second signal indicating whether to operate the switched-mode power converter in the buck mode of operation or the boost mode of operation based on the first voltage and a second voltage domain defined by the first voltage; and
   combining the first signal and the second signal to generate a digital configuration indicator signal.

2. The method as recited in claim 1 further comprising:
   comparing the first voltage to a predetermined threshold voltage and generating an indication thereof in the first voltage domain;
   storing the indication to generate a latch output signal and a complementary latch output signal in the first voltage domain; and
   inverting the latch output signal to generate an inverted latch output signal wherein the first signal is generated using the inverted latch output signal and the complementary latch output signal in the first voltage domain.

3. The method as recited in claim 2 wherein the predetermined threshold voltage is a threshold voltage of a high voltage n-type transistor.

4. The method as recited in claim 2 wherein the comparing includes feeding back the indication to speed up generation of the indication.

5. The method as recited in claim 2 further comprising:
   inverting a logic level corresponding to the first voltage and generating an inverted signal in the second voltage domain; and
   latching the inverted signal to generate a second latch output signal in the second voltage domain; and
   inverting the second latch output signal to generate a second configuration indicator signal in the second voltage domain,
   wherein the first voltage domain is referenced to the maximum voltage and the second voltage domain is referenced to the first voltage.

6. The method as recited in claim 1 further comprising:
   level-shifting a version of the digital configuration indicator signal using the first voltage to generate a first digital configuration signal; and
   level-shifting the version of the digital configuration indicator signal using the second voltage to generate a second digital configuration signal.

7. The method as recited in claim 6 wherein when the switched-mode power converter is configured in the boost mode of operation and the switched-mode power converter is disabled, the first digital configuration signal is active and the second digital configuration signal is inactive.

8. The method as recited in claim 6 wherein when the switched-mode power converter is configured in the boost mode of operation, the first digital configuration signal indicates the switched-mode power converter is configured in the boost mode of operation prior to the second digital configuration signal.

9. The method as recited in claim 1 wherein the digital configuration indicator signal is generated during a power-on sequence of an integrated circuit including the switched-mode power converter, prior to the first voltage reaching a constant voltage level.

10. An integrated circuit product including a switched-mode power converter, the integrated circuit product comprising:
   a first node configured as an input node in a boost mode of operation of the switched-mode power converter;
   a second node configured as the input node in a buck mode of operation of the switched-mode power converter;
   a maximum voltage node;
   a maximum voltage selection circuit configured to provide to the maximum voltage node as a maximum voltage, a version of the higher of a first voltage on the first node and a second voltage on the second node;
   a first circuit configured to provide a first signal indicating whether to operate the switched-mode power converter in the buck mode of operation or the boost mode of operation based on the first voltage and a first voltage domain defined by the maximum voltage;
   a second circuit configured to provide a second signal indicating whether to operate the switched-mode power converter in the buck mode of operation or the boost mode of operation based on the first voltage and a second voltage domain defined by the first voltage; and
   a third circuit configured to combine the first signal and the second signal to generate a digital configuration indicator signal in the first voltage domain.

11. The integrated circuit product as recited in claim 10 further comprising:
   a pull-down transistor controlled by a signal from the first circuit to selectively discharge an output node of the second circuit.

12. The integrated circuit product as recited in claim 10 wherein the first circuit comprises:
   a coarse comparator configured to generate an indication of a comparison of the first voltage to a predetermined threshold voltage in the first voltage domain;
   a latch configured to store the indication and generate a latch output signal and a complementary latch output signal in the first voltage domain based on the indication; and
   an inverting circuit configured to generate the first signal based on the latch output signal and the complementary latch output signal in the first voltage domain.

13. The integrated circuit product as recited in claim 12 wherein the coarse comparator comprises:
   a skewed inverter; and
   a feed back circuit responsive to the indication to speed up generation of the indication.

14. The integrated circuit product as recited in claim 10 wherein the second circuit comprises:
   a first inverter configured to invert a logic level corresponding to the first voltage and generating an inverted signal in the second voltage domain; and
   a latch circuit configured to store the inverted signal and to generate a second latch output signal in the second voltage domain; and
   a second inverter configured to invert the second latch output signal to generate a second configuration indicator signal in the second voltage domain,
   wherein the first voltage domain is referenced to the maximum voltage and the second voltage domain is referenced to the first voltage.

15. The integrated circuit product as recited in claim 10 further comprising:
   a first level-shifter configured to adjust a level of a version of the digital configuration indicator signal using the first voltage to generate a first digital configuration signal; and
   a second level-shifter configured to adjust the level of the version of the digital configuration indicator signal using the second voltage to generate a second digital configuration signal.

16. The integrated circuit product as recited in claim 10 wherein the second node and a third node are coupled to corresponding terminals of an integrated circuit package, the first node is coupled to ground, and the digital configuration indicator signal indicates the switched-mode power converter is configured in the buck mode of operation.

17. The integrated circuit product as recited in claim 10 wherein the first node is coupled to a first terminal of an integrated circuit package, the second node and a third node are coupled to a second terminal of the integrated circuit package, and the digital configuration indicator signal indicates the switched-mode power converter is configured in the boost mode of operation.

18. The integrated circuit product as recited in claim 17 further comprising:
   a fourth node; and
   a fifth node,
   wherein the fourth node and the fifth node are coupled to second corresponding terminals of the integrated circuit package, the fourth node being coupled to ground and the fifth node being coupled to an inductor external to the integrated circuit package.

19. An integrated circuit product including a switched-mode power converter, the integrated circuit product comprising:
   a first circuit configured to provide a first digital configuration signal indicating whether to operate the switched-mode power converter in a buck mode of operation or a boost mode of operation; and
   a second circuit configured to provide a second digital configuration signal indicating whether to operate the switched-mode power converter in the buck mode of operation or the boost mode of operation,
   wherein in response to the switched-mode power converter being configured in the boost mode of operation and the switched-mode power converter being disabled, the first digital configuration signal is active and the second digital configuration signal is inactive, and
   wherein in response to the switched-mode power converter being configured in the boost mode of operation, the first digital configuration signal indicates the switched-mode power converter is configured in the boost mode of operation prior to the second digital configuration signal indicating the switched-mode power converter is configured in the boost mode of operation.

20. The integrated circuit product as recited in claim 19 wherein the first digital configuration signal is referenced to a maximum voltage of a version of the higher of a first voltage on a first node and a second voltage on a second node, and the second digital configuration signal is referenced to the first voltage.

* * * * *